United States Patent
Haramaty et al.

(10) Patent No.: US 11,734,005 B2
(45) Date of Patent: Aug. 22, 2023

(54) PROCESSOR WITH SPLIT READ

(71) Applicant: MELLANOX TECHNOLOGIES, LTD., Yokneam (IL)

(72) Inventors: Zachy Haramaty, Hemed (IL); Yaniv Strassberg, Yokneam (IL); Itsik Levi, Shapir (IL); Alon Singer, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/367,367

(22) Filed: Jul. 4, 2021

(65) Prior Publication Data
US 2023/0004392 A1    Jan. 5, 2023

(51) Int. Cl.
G06F 9/30    (2018.01)
G06F 12/02   (2006.01)

(52) U.S. Cl.
CPC ........ G06F 9/30101 (2013.01); G06F 12/023 (2013.01); *G06F 2212/251* (2013.01)

(58) Field of Classification Search
CPC .............. G06F 9/30101; G06F 12/023; G06F 2212/251
See application file for complete search history.

(56) References Cited

U.S. PATENT DOCUMENTS

| 5,778,434 A | 7/1998 | Nguyen et al. |
|---|---|---|
| 7,694,079 B2 | 4/2010 | Abouelwafa |
| 7,698,453 B2 | 4/2010 | Samuels et al. |
| 7,836,328 B1 * | 11/2010 | Puri ............ G06F 11/0793 714/2 |
| 8,244,950 B2 | 8/2012 | Barth et al. |
| 11,500,641 B2 | 11/2022 | Abdelhafez et al. |
| 2004/0019713 A1 * | 1/2004 | Bissessur ........... G06F 12/0284 710/33 |
| 2005/0172055 A1 | 8/2005 | Ho et al. |
| 2006/0020606 A1 * | 1/2006 | Harris .................. G06F 13/385 |
| 2006/0288195 A1 | 12/2006 | Ma et al. |
| 2007/0273699 A1 | 11/2007 | Sasaki et al. |
| 2013/0036152 A1 | 2/2013 | Goyal et al. |
| 2016/0070648 A1 | 3/2016 | Wu |
| 2017/0083326 A1 | 3/2017 | Burger et al. |
| 2017/0083329 A1 | 3/2017 | Burger et al. |
| 2020/0371917 A1 | 11/2020 | Chachad et al. |
| 2021/0279064 A1 | 9/2021 | Deglin et al. |

(Continued)

OTHER PUBLICATIONS

Adve et al., "Shared Memory Consistency Models: A Tutorial," IEEE, Computer, vol. 29, issue 12, pp. 66-76, Dec. 1996.

(Continued)

*Primary Examiner* — Zachary K Huson
(74) *Attorney, Agent, or Firm* — Kligler & Associates Patent Attorneys Ltd

(57) ABSTRACT

An apparatus includes a processor and split-read control circuitry (SRCC). The processor is to issue a set of one or more split-read requests for loading one or more data values to one or more respective local registers of the processor. The SRCC is to receive the set of one or more split-read requests, to read the one or more data values on behalf of the processor, and to write the data values into the one or more respective local registers. The processor and the SRCC are to coordinate a status of the split-read requests via a split-read-status indication.

16 Claims, 4 Drawing Sheets

(56) References Cited

U.S. PATENT DOCUMENTS

2022/0107811 A1    4/2022   Abdelhafez et al.

OTHER PUBLICATIONS

Maranget et al., "A Tutorial Introduction to the ARM and POWER Relaxed Memory Models," Revision 120, University of Cambridge, pp. 1-50, Oct. 10, 2012.
Waterman et al., "The RISC-V Instruction Set Manual, vol. II: Privileged Architecture," version 1.9.1, pp. 1-87, Nov. 4, 2016.
Waterman et al., "The RISC-V Instruction Set Manual, vol. II: Privileged Architecture," version 1.9.1, chapter 3.5.4, pp. 41-42, Nov. 4, 2016.
Waterman et al., "The RISC-V Instruction Set Manual, vol. I: Unpriviledged ISA," Document Version 20190608—Base-Ratified, pp. 1-236, Jun. 8, 2019.
U.S. Appl. No. 17/748,066 Office Action dated Jun. 1, 2023.

\* cited by examiner

PROCESSOR WITH SPLIT READ

FIELD OF THE INVENTION

The present invention relates generally to computer systems, and particularly to methods and systems for split read cycles in computer systems.

BACKGROUND OF THE INVENTION

Computer systems sometimes use split response memory read cycles (referred to hereinbelow as Split-Read cycles), wherein a processor requests a memory read operation, and a memory-subsystem responds with the requested data (and, sometimes, with an Acknowledge (ACK) or a Negative Acknowledge (HACK) indication).

U.S. Pat. No. 8,244,950 describes an interface technique where non-split read requests are received from at least one requestor, and upstream commands based on these requests are transmitted, wherein response data is received in reply to commands that were previously transmitted, and responses are transmitted to a requester based on the response data; including a buffer unit for storing command identification data that identifies commands that were already transmitted or that are still to be transmitted, and response availability data that specifies response data that has been received by the receive engine.

SUMMARY OF THE INVENTION

An embodiment of the present invention that is described herein provides an apparatus including a processor and split-read control circuitry (SRCC). The processor is to issue a set of one or more split-read requests for loading one or more data values to one or more respective local registers of the processor. The SRCC is to receive the set of one or more split-read requests, to read the one or more data values on behalf of the processor, and to write the data values into the one or more respective local registers. The processor and the SRCC are to coordinate a status of the split-read requests via a split-read-status indication.

In some embodiments, the processor is to specify, in the split-read-status indication, a number of the split-read requests in the set, and the SRCC is to update the split-read-status indication upon writing each of the data values into the local registers. In an embodiment, the split-read-status indication includes a respective indicator for each split-read request in the set, each indicator indicating whether the respective split-read request has been completed by the SRCC. In a disclosed embodiment, the processor is to suspend an instruction that accesses a local register, in response to identifying in the split-read-status indication that a split-read request corresponding to the local register is not yet completed.

In some embodiments, the processor is to specify, in the set, two or more local registers having sequential indices. In an example embodiment, the processor is to specify to the SRCC an index of a first local register in the set. In an embodiment, the SRCC is to serve a split-read request on behalf of the processor by (i) issuing an external memory read request corresponding to the split-read request, (ii) assigning a tag to the external memory read request, and upon receiving an external memory read response having the tag, storing a data value provided in the external memory read response in a local register specified by the split-read request.

There is additionally provided, in accordance with an embodiment of the present invention, a method including issuing, by a processor, a set of one or more split-read requests for loading one or more data values to one or more respective local registers of the processor. Using spit-read control circuitry (SRCC), the set of one or more split-read requests is received from the processor, the one or more data values are read on behalf of the processor, and the data values are written into the one or more respective local registers. A status of the split-read requests is coordinated between the processor and the SRCC via a split-read-status indication.

There also provided, in accordance with an embodiment of the present invention, a method for executing read requests on behalf of a processor. The method includes receiving, from the processor, a set of read requests that request loading data values to respective local registers of the processor. The data values are read on behalf of the processor from a memory. The data values, which were read from the memory, are written into the local registers of the processor.

The present invention will be more fully understood from the following detailed description of the embodiments thereof, taken together with the drawings in which:

DETAILED DESCRIPTION OF EMBODIMENTS

Overview

Figure 1:
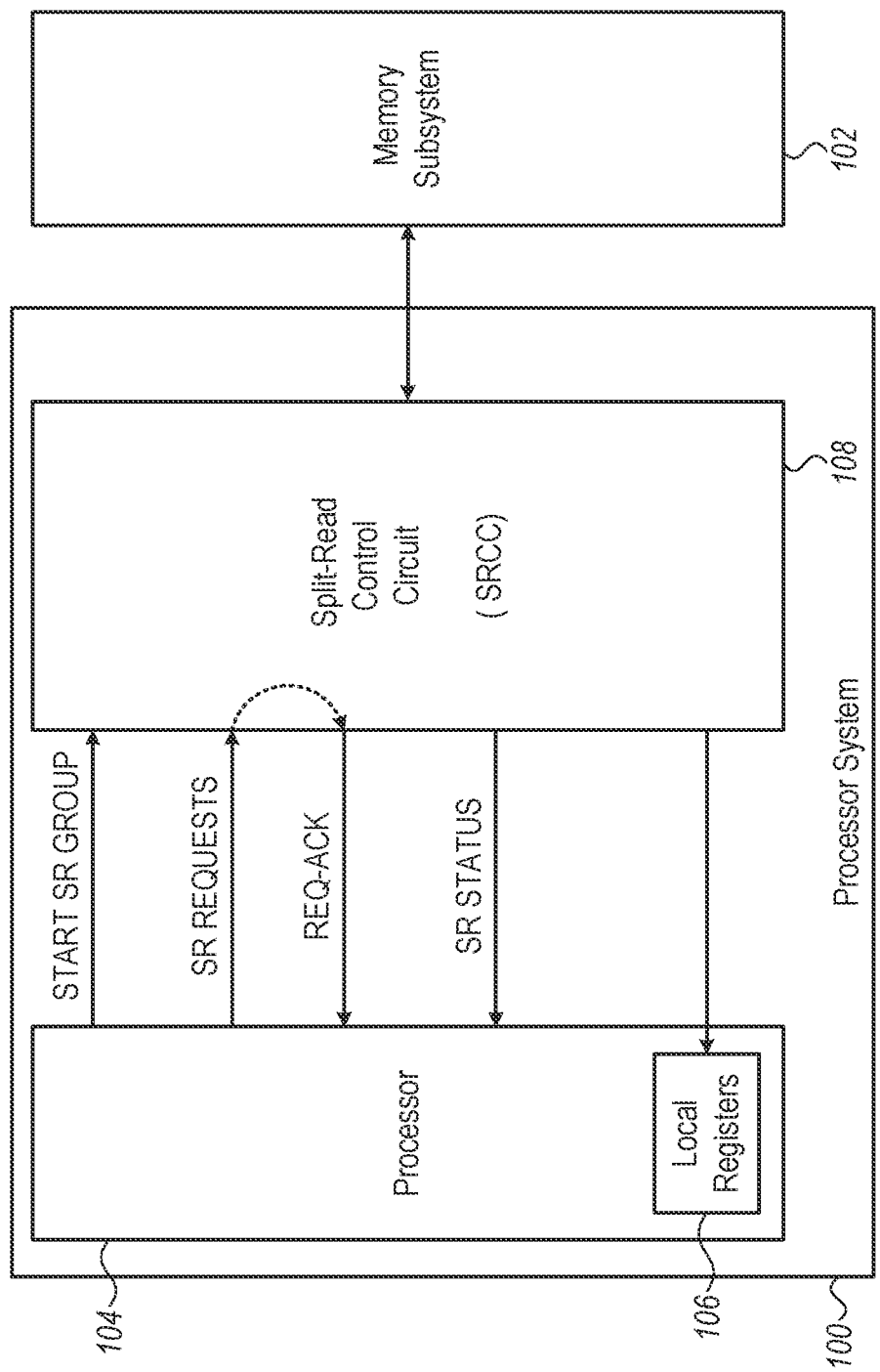
FIG. 1 is a block diagram that schematically describes a Processor System, in accordance with an embodiment of the present invention.

The performance of processor systems is often limited by memory access latency. With small Random-Access Memories (RAMS) that are near the processor, performance degradation may be small (e.g., one additional clock cycle), but when large memory subsystems are accessed, performance may be severely degraded.

In the description hereinbelow we will refer to processors and processor systems, wherein a processor is an apparatus that is configured to execute instructions, such as one or more central processing units (CPUs), Graphic Processor Units—(CPUs), and similar; whereas a processor system is an apparatus comprising a processor and processor peripheral circuits, such as encryption circuits, DMA circuits etc.

To mitigate the memory access performance degradation problem, two main techniques can be used—a hierarchical memory structure and/or posted memory cycles. Hierarchical memory structure refers to a computer that has a hierarchy of memories, from a very small and very fast cache memory and down to very large memories that are very slow (e.g., Flash memories).

The other technique to mitigate memory-access related performance degradation is posted memory cycles (sometimes called posted memory cycles). In posted-Write, for example, a processor posts a write request; a memory controller then executes the write; the processor does not have to wait for the write operation to complete, until the processor (or, sometimes, another processor that can access the memory) reads the written data. In Split-Read, the processor posts a read request, and may proceed to execute other instructions (including posting other read requests) until the processor needs the requested data (Various techniques are used to guarantee data integrity, particularly in multi-processing systems, including, for example, memory fencing.)

While posted-Write implementation is relatively simple, Split-Read is more demanding. For example, memory responses may arrive out-of-order, and the processor should be notified when the read operation (or a sequence of read operations) completes.

Embodiments according to the present invention provide apparatuses and methods for efficient split-read operations in a processor system. In some embodiments, a processor issues a series of split read requests to load data in a group of local registers of the processor, to a Split-Reads Control Circuit (SRCC). The SRCC is configured to receive the series of split read requests, to immediately acknowledge the request, and to submit a corresponding series of memory read requests to a memory subsystem. In an embodiment, the SRCC is configured, upon receiving a response from the memory subsystem, to immediately write the received data into a corresponding local register of the processor. In some embodiments, the processor indicates to the SRCC the number of read requests in a group of split read requests that the processor will issue, and the SRCC indicates to the processor when the series of split reads has been fully completed; in an embodiment, the indication is stored in a bit-map status register and in another embodiment, the indication is a request-completion count.

In some embodiments, the SRCC is configured to add tags to the memory subsystem requests, and to use the tags to reorder responses that the SRCC may receive of from the memory subsystem.

In an embodiment, the local registers to which the split reads correspond are sequentially-indexed; the processor is configured to send to the SRCC, prior to the series of split reads, the index of the first local register to which the first split read corresponds, and the SRCC is configured to increment the index of the first local register in further split read requests, so as to obtain a pointer to the local register for each split read.

Thus, according to embodiments of the present invention, processor systems may post read requests, and a SRCC handles the requests efficiently and with minimal processor intervention.

System Description

In the description of embodiments hereinbelow, we will refer mainly to processors comprising a Central Processing Unit (CPU) that executes a software program. Embodiments in accordance with the present invention, however, are not limited to processors that comprise a CPU. In alternative embodiments, the processor may comprise multiple CPUs; in an embodiment, the processor comprises one or more Graphic Processor Units (CPUs); in other embodiments, other types of processors may be used, such as network processors, video processors, and any combination of processors.

FIG. 1 is a block diagram that schematically describes a Processor System 100, in accordance with an embodiment of the present invention Processor System 100 is coupled to a memory subsystem 102, which is configured to store data and instructions that the processor system may access.

Processor System 100 comprises a Processor 104, which is configured to run software programs that may include accessing memory subsystem 102 for instructions and/or for data. In an embodiment, the processor is configured to post read requests for efficient execution of one or more read operations.

In some embodiments, processor 104 further comprises local registers 106, and the split read requests read data from the memory subsystem to one or more of processor local registers 106. Each one of local registers 106 is identified by a unique index; in embodiments, the indices of the local register are sequential. (For brevity, we will refer hereinbelow to a register with index=n as register-n, or local register-n.)

According to the example embodiment illustrated in FIG. 1, Processor System 100 further comprises a Split-Read-Control-Circuit (SRCC) 108. The SRCC is configured to: i) receive from processor 104 one or more split-read requests, ii) falsely acknowledging the Read requests (so that the processor will not wait for the read to complete), send in the requests to Memory Subsystem 102, iv) upon receiving a response from the memory subsystem—writing the read data into a respective local register of processor registers 106 and, v) updating a split-read status register that the processor may read.

In the description hereinbelow we will sometimes refer to the local register into which a split-read request loads the read data, as the target register of the respective read request.

In an embodiment, after sending the group of split read requests to the SRCC, the processor continues program execution until a point in which program execution requires reading a local register which is the target register of one of the split reads. When this point is reached, the processor may check the split-read status indication, and, responsively, either continue program execution or wait.

Thus, according to the example embodiment illustrated in FIG. 1, the processor may issue a group of split-read requests; a SRCC accesses the memory subsystem to execute the read requests; the processor may continue program execution until all read requests are split, and then, when needed, waits until the split read requests are fulfilled.

As would be appreciated, the configuration of processor system 100 illustrated in FIG. 1 and described above is an example configuration that is cited by way of example. Other suitable configurations may be used in alternative embodiments. For example, in some embodiments, a single SRCC may support split reads for more than a single processor. In some embodiments, SRCC 108 may comprise memory mapping functions and in other embodiments the SRCC may comprise memory protection functions.

Figure 2:
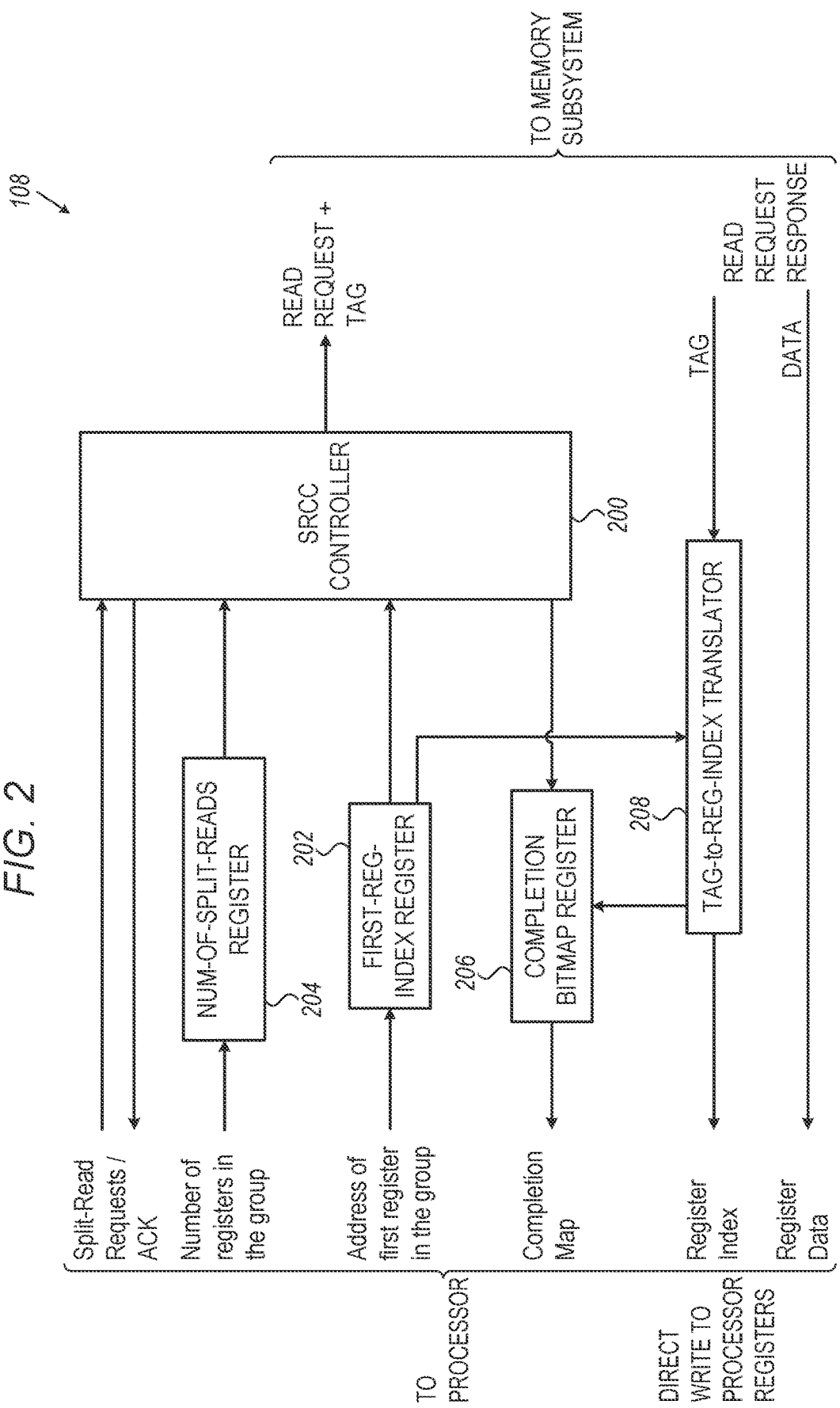
FIG. 2 is a block diagram that schematically illustrates the structure of a Split Read Control Circuit (SRCC), in accordance with an embodiment of the present invention.

FIG. 2 is a block diagram that schematically illustrates the structure of Split Read Control Circuit (SRCC) 108, in accordance with an embodiment of the present invention. As explained above with reference to FIG. 1, the SRCC executes split read instructions from memory subsystem 102 that processor 104 requests and writes the results directly in local registers 106. Each of local registers 106 is accessed by an index number.

SRCC 100 comprises a SRCC Controller 200. A First-Reg-index Register 202, a Num-of-Split-Reads Register 204, a Completion-Bitmap Register 206, and a Tag-to-Reg-Index Translator 208. Prior to sending a group of split read requests, the processor may send to the SRCC the index of the target local processor register of the first split-read, to be stored in the First-Reg-Index Register 202. The processor may then send to the SRCC the number of split read requests in the group, to be stored in the Num-of-Split-Reads Register 204.

After storing the first register index and the number of split reads in the corresponding SRCC registers, the processor may issue the group of split read requests. In an embodiment, the requests pertain to target local registers having sequential indexes, wherein the index of the first register is the number stored in First-Reg-Index Register 202. For example, if the processor sends a value "8" to the SRCC, to be stored in First-Reg-Index Register 202, and a value "3", to be stored in the Num-of-Split-Reads Register 204; then, the first subsequent split-read request that the processor sends will request reading data from memory and storing the data in local register-8, the second request will request storing the read data in local register-9 and the third read request will read data to local register-10. In embodiments, the SRCC immediately acknowledges each split-read request (although the corresponding read has not finished), allowing the processor to proceed rather than wait for the read completion.

The SRCC Controller issues memory read requests that correspond to the split-read requests, to memory subsystem 102. In an embodiment, the SRCC Controller attaches a 0-tag to the first request, a 1-tag to the second request, and so on. When the SRCC receives from the memory subsystem responses to the memory requests, the Tag-to-Reg-Index Translator circuit 208 translates the received tag to a target local register index (e.g., by adding the contents of the First-Reg-Index register to the received tag). The SRCC control then writes the data returned from the memory subsystem into the target local processor register.

In parallel, responsively to the memory subsystem response, Completion-Bitmap Register 206 updates, for example, by setting a bit that corresponds to the respective target register. The processor will, by examining the contents of the Completion-Bitmap Register, determine whether the program should wait or proceed.

As would be appreciated, the configuration of SRCC 108 illustrated in FIG. 2 and described above is cited by way of example. Any other suitable configurations may be used in alternative embodiments. For example, in some embodiments, a Split-Read-Completion counter replaces the completion bitmap register; in an embodiment, the Num-of-Split-Reads register is replaced by a Last-Reg-Index register, and in another embodiments the register index or a mapping thereof is used as the tag.

Order of Events

Figure 3:
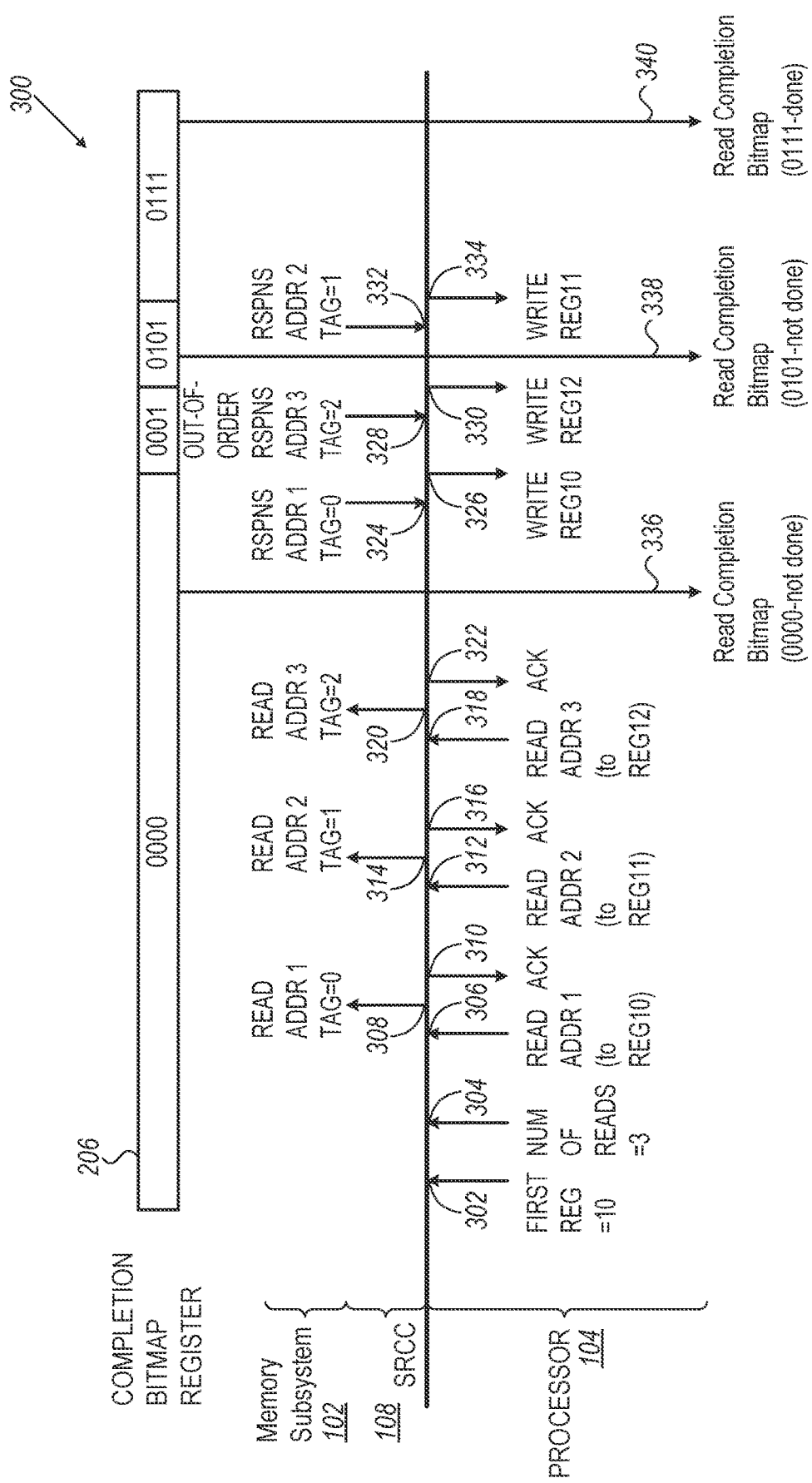
FIG. 3 is a sequence diagram that schematically illustrates timed messages in a split-read sequence, accordance with an embodiment of the present invention.

FIG. 3 is a sequence diagram that schematically illustrates timed messages in a spilt-read sequence 300, in accordance with an embodiment of the present invention. The sequence diagram illustrates messages communicated between processor 104, SRCC 108 and memory subsystem 102 (FIG. 1). In addition, sequence diagram 300 illustrates the status of Completion Bitmap Register 206 (FIG. 2).

The first communication message is a message 302, wherein the processor writes "10" into the SRCC's First_Reg_Index register 206 (FIG. 2), indicating that the target local register of the first split-read in the ensuing split-read sequence will be local register-10. Next, at a message 304, the processor writes "3" into SRCC Num-of-Split-Reads register 204 (FIG. 2). In some embodiments, the order of messages 302 and 304 may be interchanged; in embodiment, both messages 302 and 304 may be coalesced to a single message.

Next, the processor sends a first split read request 306, asking that the data in memory subsystem 102, located at an address ADDR 1, be fetched, and copied to a processor local register. As the First_Reg_Index register has been programmed with "10", the target local register is register-10. The SRCC next sends a READ ADDRESS-1 message to the memory subsystem, with a Tag=0 (the tag is sent so that the response to the request could be differentiated from responses to other requests, which may be received out-of-order). Right thereafter, the SPEC sends an Acknowledge message 310 to the processor, which can then proceed to the next instruction in the program that the processor executes. In embodiments, the order of messages 308 and 310 may be interchanged; in some embodiments, messages 308 and 310 may be sent at the same time.

The sequence of messages 306, wherein the processor sends a split read request; 308, wherein the SRCC sends a corresponding request to the memory subsystem, and 310, wherein the SRCC acknowledges the request, now repeats three times—messages 312, 314, and 316 for the second split-read (ADDR 2, Tag=1), and messages 312, 314 and 316 for the third split-read (ADDR 3, Tag=2). The first response from the memory subsystem is a message 324, which returns the data stored in ADDR-1, with tag=0 indication Responsively, the SRCC writes the returned data to local register-10 (the first target register, as defined in First_Reg_Index register 202).

The next message from the memory subsystem is an out-of-order response message 328, which is a response to the third split-read request 320. The SRCC recognizes that this is the tag sent with the third split read request and, in a message 330, writes the returned data in local register-12. Similarly, the target local register for a message 332 from the memory subsystem, with tag=1, is register-11; and, accordingly, in a message 334, the SRCC writes the returned data in processor local register-11.

The status of Completion Bitmap Register 206 (FIG. 2) is illustrated at the top portion of FIG. 3. In the example embodiment illustrated in FIG. 3, Completion-Bitmap register 206 comprises four bits, and supports up to four split-read requests in each group of split-reads; in other embodiments, the Completion-Bitmap register may comprise any other suitable number of bits, e.g., 32.

After sending message 318 (the last split read request), the processor may wish to check if all split read requests have been fulfilled, e.g., in order to execute instructions that access local registers which are the target registers of some of the split read requests. In a Read Completion Bitmap message 336, the processor reads the Completion Bitmap Register, which stores binary 0000—no request has been fulfilled, and the processor will not continue execution. In a Read Completion Bitmap message 338, the processor, again, reads the Completion Bitmap Register, this time getting binary 0101 meaning that not all requests have been fulfilled. Lastly, in a Read Completion Bitmap message 340, the processor reads the Completion-Bitmap register, this time getting binary 0111—all Three requests of the current split-read group have been fulfilled, and the processor may access the corresponding target registers.

As would be appreciated, the sequence diagram illustrated in FIG. 3 and described herein is an example that is cited for the purpose of conceptual clarity. Other suitable sequence charts may be used in alternative embodiments. For example, in an embodiment, rather than waiting for all requests to be fulfilled, the processor may continue operation when the SRCC loads data in a given target register, until a point where other registers are needed.

Figure 4:
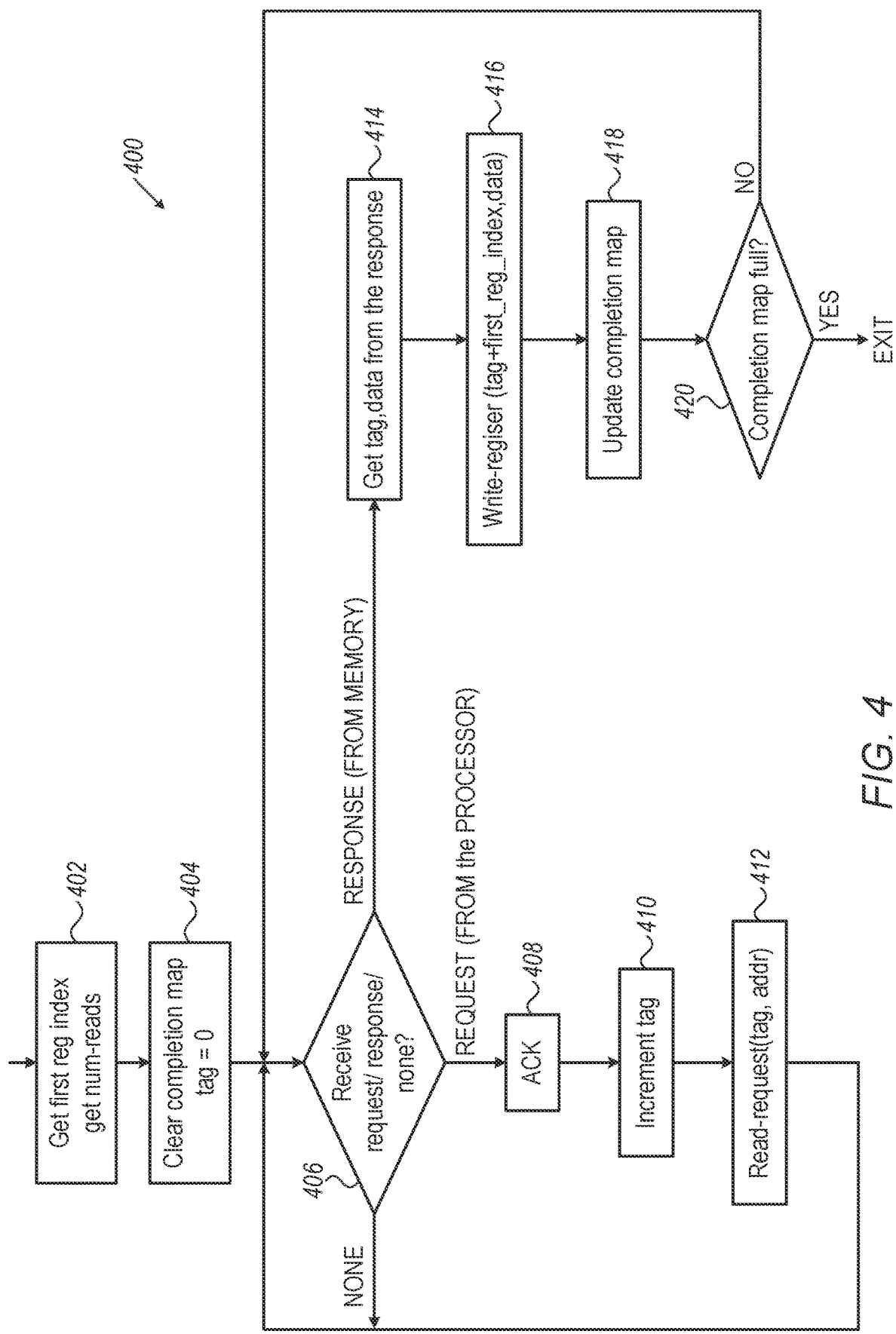
FIG. 4 is a flowchart that schematically illustrates a method for executing split reads in a processor system, in accordance with an embodiment of the present invention.

FIG. 4 is a flowchart 400 that schematically illustrates a method for executing split reads in a processor system, in accordance with an embodiment of the present invention. The flowchart is executed by SRCC 108 (FIG. 1).

The flowchart starts at a Get First-Index step, wherein the SRCC gets the index of the target register, for the first split read. The SRCC may store the index, for example, in First_Reg_Index register 202 (FIG. 2).

Next, the SRCC enters a Clear-Completion-Map-and-Tag step 404, wherein the SRCC clears a Completion Map Register (e.g., Completion-Bitmap register 206, FIG. 2) and clears a TAG register which will be used to access the memory system in response to the split-read requests. The SRCC then enters a Check-Received-Requests/Responses step 406, wherein the SRCC waits until the processor sends a split-Read request, or until the memory subsystem sends a response (the earlier). (Step 406 is a root of two loops in flowchart 400—a loop that handles requests, and a loop that handles responses.)

If, in step 406, the SRCC receives a split-read request, the SRCC enters an ACM step 408 and sends an Acknowledge signal to the processor, enters an Increment-TAG step 410 and increments the TAG register, and then, in a Read-Request step 412, sends a memory access to the memory subsystem, with a tag that is equal to the TAG register, and an address that is equal to the address in the split-read request. The SRCC then reenters step 406.

It, in step 406, the SRCC is a response for the memory subsystem, the SRCC enters a Get-Tag-and-DATA step 414 wherein the SRCC extracts the returned data and the tag from the response, and then enters a Write-Register step 416. In step 416, the SRCC writes the data that the memory subsystem has sent to the target register; the index of the register is calculated by adding the contents of the First-Reg-Index register to the tag that the memory subsystem returns. The SRCC then enters an Update Completion Map step 418 and updates the completion map to indicate that the corresponding request has been fulfilled. Next, the SRCC enters a Check-Completion-Map-Full step 420 and checks the completion map to see if all completion indications are set. If so, the flowchart ends. If one or more requests are not fulfilled yet, the SRCC reenters step 406, for another loop.

Thus, a method according to the example embodiment illustrated in FIG. 3, provides split-read capabilities to a processor that is attached to a SRCC, wherein the SPEC accesses a memory subsystem to execute the split read requests, and writes the read data directly into the processor local registers.

As would be appreciated, the flowchart described herein is cited by way of example. Other suitable flowcharts may be used in alternative embodiments. For example, in some embodiments, Increment-Tag step 410 may precede ACK step 408; in other embodiments, some of the steps may be executed in parallel.

Register Space

According to embodiments, the processor communicates with the SRCC by writing and reading registers. This includes writing the number-of-split-reads, writing the first-reg-index, reading the completion-bitmap and writing the split read requests. In some embodiments, some or ail the accesses are done using a predefined set of processor Control-Registers (CR) Space. In other embodiments, some or all the accesses are memory mapped registers that the processor accesses using a memory access; the access is intercepted by the SRCC and directed to internal SRCC registers.

In some embodiments, the CR space is further divided to local and non-local CR space, wherein the local CR space registers have faster access time. In an embodiment, registers like Num-of-Split-Reads are in the local CR-space, whereas the split-read requests access a non-local CR-space; thus, the configuration of the SRCC is local (fast) and the split reads are from the non-local CR-space.

Software Support

To use the split-read feature, the software program should issue split read requests for reading data to sequentially indexed processor registers. This can be done, for example, by the C compiler.

In some embodiments, two macros are defined for split-read support:

i) PRED_START(number), indicates the number of split reads, to the PRM (writes Num-Split-Reads register)

ii) PRED_END—a loop that reads the Completion Bitmap register until all Num-Split-Reads bits are set.

The configurations of processor system 100, processor 104 (including local registers 106), SRCC 108, SRCC Controller 200, SRCC registers 202, 204, 206 and Tag-to-REG-Index Translator 208; sequence chart 300 and flowchart 400, illustrated in FIGS. 1 through 4 and described hereinabove, are example configurations, sequence charts and flowcharts that are shown purely for the sake of conceptual clarity. Any other suitable configurations, sequence charts and flowcharts can be used in alternative embodiments. The different sub-units of processor system 100 including SRCC 108 may be implemented using suitable hardware, such as in one or more Application-Specific Integrated Circuits (ASICs) or Field-Programmable Gate Arrays (FPGAs), using software, using hardware, or using a combination of hardware and software elements.

Processor 104 (FIG. 1) and/or SRCC controller 200 (FIG. 2) may comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a processor, to issue a set of one or more split read requests for loading one or more data values to one or more respective local registers of the processor; and
split-read control circuitry (SRCC), to receive the set of one or more read requests, to acknowledge a given read request in the set to the processor regardless of whether the given read request has been completed, to read the one or more data values on behalf of the processor, and to write the data values into the one or more respective local registers.

2. The apparatus according to claim 1, wherein the processor is to specify, in a split-read-status indication, a number of the read requests in the set, and wherein the SRCC is to update the split-read-status indication upon writing each of the data values into the local registers.

3. The apparatus according to claim 1, wherein the SRCC is to maintain a split-read-status indication that comprises a respective indicator for each read request in the set, each indicator indicating whether the respective read request has been completed by the SRCC.

4. The apparatus according to claim 3, wherein the processor is to suspend an instruction that accesses a local register, in response to identifying in the split-read-status indication that a read request corresponding to the local register is not yet completed.

5. The apparatus according to claim 1, wherein the processor is to specify, in the set, two or more local registers having sequential indices.

6. The apparatus according to claim 5, wherein the processor is to specify to the SRCC an index of a first local register in the set.

7. The apparatus according to claim 1, wherein the SRCC is to serve a read request on behalf of the processor by:
issuing an external memory read request corresponding to the read request;
assigning a tag to the external memory read request; and
upon receiving an external memory read response having the tag, storing a data value provided in the external memory read response in a local register.

8. A method, comprising:
issuing, by a processor, a set of one or more split-read requests for loading one or more data values to one or more respective local registers of the processor; and
using split-read control circuitry (SRCC), receiving the set of one or more read requests from the processor, acknowledging a given read request in the set to the processor regardless of whether the given read request has been completed, reading the one or more data values on behalf of the processor, and writing the data values into the one or more respective local registers.

9. The method according to claim 8, further comprising specifying by the processor, in a split-read-status indication, a number of the read requests in the set, and updating the split-read-status indication by the SRCC upon writing each of the data values into the local registers.

10. The method according to claim 8, further comprising maintaining by the SRCC a split-read-status indication that comprises a respective indicator for each read request in the set, each indicator indicating whether the respective read request has been completed by the SRCC.

11. The method according to claim 10, and comprising suspending, by the processor, an instruction that accesses a local register, in response to identifying in the split-read-status indication that a read request corresponding to the local register is not yet completed.

12. The method according to claim 8, wherein issuing the set of the one or more read requests comprises specifying, in the set, two or more local registers having sequential indices.

13. The method according to claim 12, wherein specifying the local registers comprises specifying to the SRCC an index of a first local register in the set.

14. The method according to claim 8, wherein serving a read request on behalf of the processor using the SRCC comprises:
issuing an external memory read request corresponding to the read request;
assigning a tag to the external memory read request; and
upon receiving an external memory read response having the tag, storing a data value provided in the external memory read response in a local register.

15. A method for executing read requests on behalf of a processor, the method comprising:
receiving, from the processor, a set of read requests that request loading data values to respective local registers of the processor;
reading the data values on behalf of the processor from a memory, and acknowledging a given read request in the set to the processor regardless of whether the given read request has been completed; and
writing the data values, which were read from the memory, into the local registers of the processor.

16. The method according to claim 15, and comprising coordinating a progress of the read requests with the processor using a read-status indication.

* * * * *